May 27, 1930.   J. P. REMINGTON   1,760,850
VARIABLE SPEED GEARING
Filed Jan. 21, 1928   2 Sheets-Sheet 1
FIG. I.
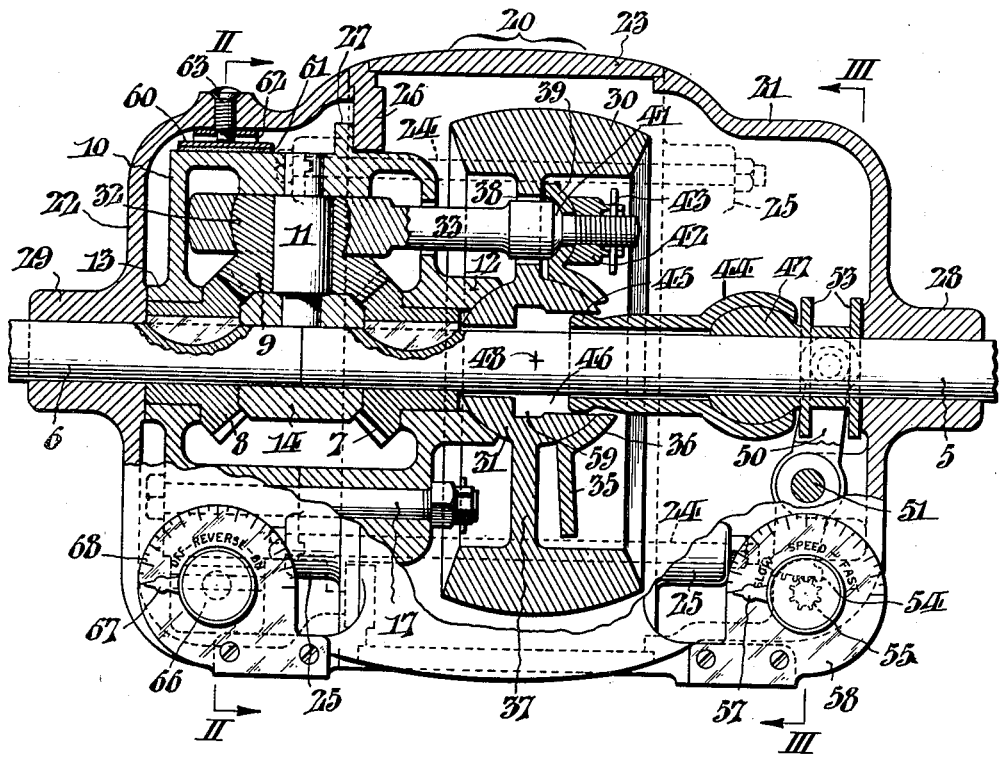
FIG. IV.
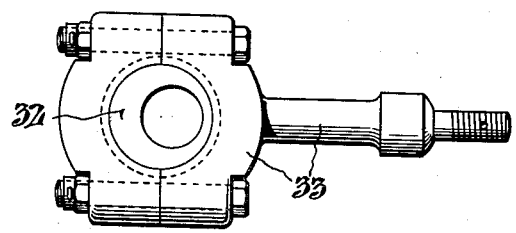
WITNESSES
Thomas W. Kerr, Jr.
George M. Beauchamp
INVENTOR:
Joseph P. Remington,
BY Haley & Paul
ATTORNEYS.

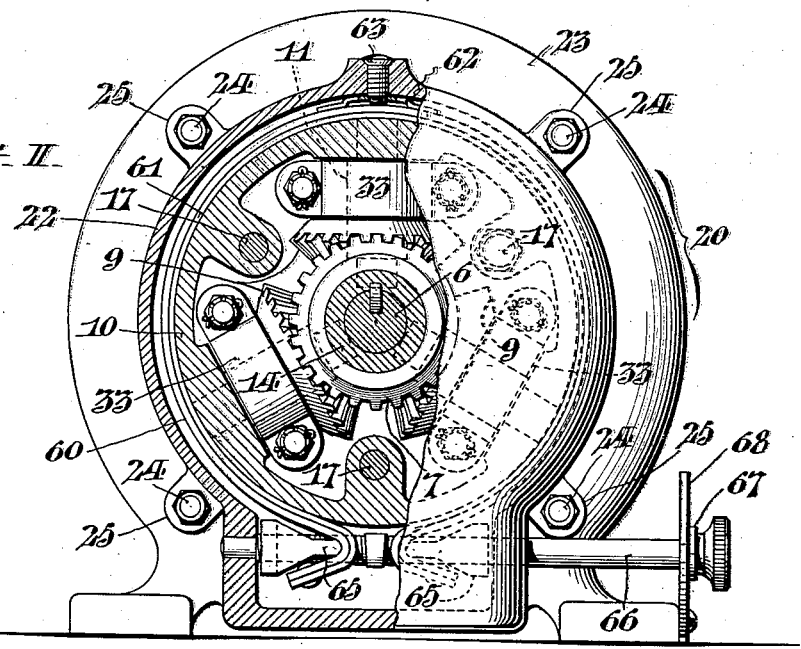
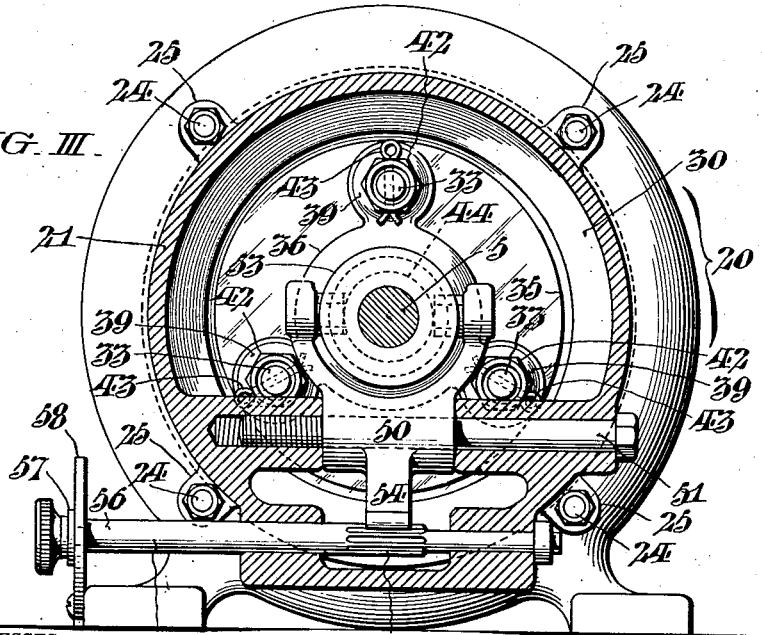

Patented May 27, 1930

1,760,850

UNITED STATES PATENT OFFICE

JOSEPH P. REMINGTON, OF PHILADELPHIA, PENNSYLVANIA, ASSIGNOR TO JAMES H. BELL, OF PHILADELPHIA, PENNSYLVANIA

VARIABLE-SPEED GEARING

Application filed January 21, 1928. Serial No. 248,333.

This invention relates to variable speed gearing. Such gearing, for example, may be inserted in shafting anywhere between the source of power and the ultimate load, or incorporated within the cages of electric motors (especially alternating current motors), or applied to the crank shafts of internal combustion engines for automotive and other purposes. My invention affords a simple, rugged, compact, and relatively efficient type of gearing for such uses. In the automotive field, my gearing presents the advantage of automatic adaptation of the gear ratio to varying speed and load conditions, and of allowing the usual clutch mechanism to be entirely omitted: indeed, the only controls required are a shift lever operated with the accelerator and a reverse pedal or the like. In many cases, the usual fly-wheel can also be dispensed with.

In the drawings, Fig. I shows an axial midsection through a variable speed gearing conveniently embodying my invention.

Fig. II shows a transverse section through the device, taken as indicated by the line and arrows II—II in Fig. I.

Fig. III shows a transverse section taken as indicated by the line and arrows III—III in Fig. I.

Fig. IV is a detached side view of one of the parts shown in Fig. I.

The gearing here illustrated is of a differential epicyclic type, the gears being in the present instance beveled. Besides coaxial driving and driven shafts 5, 6, it comprises a driving gear 7 keyed fast to the shaft 5, a driven gear 8 keyed fast to the shaft 6, and an intermediate member or connective device comprising one or more epicyclic gears 9 (in the drawings three are shown) meshing with the driving and driven gears 7, 8, and carried by a rotor 10 mounted to revolve co-axially with the gears 7 and 8. In the present instance, there are three of the gears 9, arranged 120° apart, and mounted to turn freely about radial studs 11 on the rotor 10. As shown in Figs. I and II, rotor 10 comprises a drum-like casing with end hubs 12, 13 mounted to turn freely on the hubs of the gears 7, 8, and also a central hub 14 mounted to turn freely on the ends of the shafts 5, 6, between the gears 7, 8. The inner and outer ends of the studs 11 are fast in the hub 14 and in the drum wall. The drum structure 10 is made in halves which abut at the medial plane of the studs 11, and are secured together by bolts 17 (Fig. II).

The gearing and the associated parts presently to be described are enclosed in a casing 20 consisting of dished end sections 21, 22, with rabbeted edges, and a central ring section 23 clamped between them. The casing parts 21, 22, 23 are held together by bolts 24 extending through the part 23 and through external lugs 25 on the parts 21 and 22. A flat rabbeted ring 26 is interposed between the central section 23 and the end section 22 to form an internal flange in the casing 20 for engaging a corresponding external flange 27 on the drum 10, to prevent longitudinal displacement of the drum 10 and the associated parts. As shown in Fig. I, the casing ends 21, 22 are provided with bearing hubs 28, 29 for the shafts 5, 6.

The general principles of operation of an epicyclic gear train such as above described are, briefly, as follows:—

If the epicyclic gears 9 are not allowed to turn on their axes 11, while the rotor 10 is left free to turn, then the gears 7, 8, 9 and the rotor 10 will all revolve together, giving what amounts to a direct drive from the shaft 5 to the shaft 6.

If, on the other hand, the rotor 10 is held fixed and the gears 9 are allowed to turn freely on their axes 11, then the shaft 6 will be driven at the same rate of speed as the shaft 5, but in the opposite direction.

If, again, the gears 9 and the rotor 10 are neither allowed to turn freely nor held fixed, but allowed to turn only to a limited extent, then the speed of the driven shaft 6 will depend on the rate of movement of the rotor 10, and may be varied and controlled by suitably controlling its revolution.

In a word, the movement (or arrest) of the intermediate member including the rotor 10 and of the gears 9 controls the transmission ratio of the gear train.

I prefer to control the movement of the ratio-controlling intermediate member or connective device at 10 by causing or allownig it to work against the yielding resistance of a suitable inertia device or the like, which may be driven from the same source of power as the drive shaft 5, and preferably from the latter itself. As shown in the drawings, a fly-wheel 30 is mounted (universally) to revolve coaxially with the shafts 5, 6, and to rock or wobble with reference to its axis of rotation. This fly-wheel 30 has a spherical hub 31 that seats in the correspondingly concaved end of the hub 12 of the rotor 10. The fly-wheel 30 is driven to revolve with the rotor 10, and thus acts as a gyroscope in resisting deflection from a plane perpendicular to its axis of rotation (the shaft 5). In order to utilize this resistance for opposing rotary movement of the rotor 10, provision is made for operatively connecting the epicyclic gears 9 to the fly-wheel 30 in such a way that these gears can not turn (nor the rotor 10 revolve) without rocking or deflecting the fly-wheel.

For this purpose, the gears 9 have eccentric hubs 32 connected by eccentric straps and rods 33 to an actuator disc 35 whose centrally apertured spherically concave central portion 36 is seated for universal rocking on the spherical fly-wheel hub 31 around the shaft 5, at the far side of the fly-wheel web 37. The rods 33 extend, with suitable clearance, through openings 38 in said web 37, and thus cause the fly-wheel to turn with the rotor 10. The gears 9 are so engaged with the gear 7 that their eccentrics 32 stand 120° apart, and thus the rotation of the eccentrics as the rotor 10 revolves progressively deflects, oscillates, or "wabbles" the disc 35 on the hub 31 without ever shifting it bodily with reference to the hub,—neither binding it against the hub, nor allowing it to "chatter". As shown in Fig. I, the disk 35 has centrally apertured spherical portions 39 through which the reduced and screw-threaded ends of the rods 33 extend. These portions 39 of the disc 35 are engaged between spherical shoulders 41 on the rods 33 and spherically concave nuts 42 fixed on the ends of the rods by cotter pins 43. For transmitting the wabble of the actuator disc 35 to the fly-wheel 30 (when and as desired), there is a hollow connector lever 44 around the driving shaft 5, with its free end 45 extending through the central opening of the actuator 35 and engaged in the cylindrical bore 46 of the fly-wheel hub 31, and its other end universally fulcrumed on the spherical end of a hub 47 that is shiftable along the shaft 5. The connector 44 tapers toward its end 45, which has the form of a spherical head to permit of its rocking and gyrating in the hub bore 46.

With the parts in the positions shown in Fig. I, the gyrating actuator 35 never comes quite in contact with the connector 44; but when the fulcrum 47 and the connector 44 are shifted to the left from the positions shown in Fig. I,—so that a larger sized part of the connector 44 lies in the opening of the actuator 35,—the gyrating actuator 35 will engage the connector 44 and gyrate it, and with it the fly-wheel web 37. As the parts 44, 47 are shifted further and further toward the left, the gyration thus imparted to the connector 44 increases, while the lever arm of the connector end 45 with reference to the center 48 of the spherical hub 31 diminishes; accordingly, the gyration or wabble imparted to the fly-wheel 30 increases in an even greater ratio than that of the connector 44. The rate and manner of change (uniform or otherwise) in the velocity ratio of the connection between the gears 9 and the fly-wheel 30 as the parts 44, 47 are shifted one way or the other can be predetermined as desired by giving the connector 44 the proper taper or profile.

For shifting the fulcrum 47 along the shaft 5, there is shown a lever 50 fulcrumed at 51 on the interior of the casing 20. It is forked at its upper end (Figs. I and III) to engage in a groove between flanges 53, 53 on the part 47, and has a gear segment 54 on its lower end that meshes with a gear 55 on a spindle 56 extending transversely in the casing 20. This spindle 56 carries a pointer 57 that cooperates with a dial 58 mounted on the casing 20.

When the parts are in the position shown, with the pointer 57 at the zero of the dial 58, the actuator 35 does not affect the connector 45 or the fly-wheel 30; the gears 9 and the rotor 10 turn freely with the driving gear 7; and no movement whatever is imparted to the gear 8 and shaft 6. Thus the engine driving the shaft 5 is virtually unclutched from its load.

As the spindle 56 is turned clockwise and the connector 44 begins to gyrate and to oscillate or wabble the fly-wheel 30, the resistance offered by the latter to deflection from a plane perpendicular to the shaft 5 slows up the rotaton of the gears 9 and the rotor 10, so that the motion of the driving gear 7 is partly transmitted to the gear 8 and shaft 6. The further the spindle 56 is turned clockwise, the greater the oscillation or wabble imparted to the fly-wheel 30 and the less the leverage which the connector 44 has on the fly-wheel about the center 48 of its spherical surface 31,—and, therefore, the greater the resistance to rotation of the gears 9 and the rotor 10, and the larger the proportion in which the motion of the driving gear 7 is transmitted to the gear 8 and shaft 6.

As the point of engagement between the connector head 45 and the hub bore 46 approaches very close to the spherical center 48, the resistance to rotation of the gears 9 eventually becomes too great to be overcome: i. e., the gears 9 are virtually locked to the rotor 10, and all the motion of the driving gear 7 is transmitted to the gear 8 and shaft 6. Thus a direct drive is practically realized.

As shown in Fig. I, the inner end of the hub bore 46 is enlarged at 59 so that its bearing surface for the connector head 45 terminates about at the normal extreme inward position of the head, just before the engagement of the head 45 in the bore 46 comes into virtual coincidence with the spherical center 48. This enlargement at 59 definitely limits the ultimate leverage and makes it impossible for the connector 44 to jam or "lock" the gyroscope by being moved too far inward.

Besides the variation of the effective transmission ratio that can be produced by shifting the fulcrum 47, there is an automatic compensatory variation according to the load; i. e., if the load suddenly increases under a given setting of the fulcrum 47 (as when a motor vehicle encounters a hill), then the resistance to rotation of the shaft 6 will increase relative to that rotation of the gears 9 and the rotor 10 (due to the fly-wheel or gyroscope device 30), and the shaft 6 and gear 8 will slow down, while the gears 9 and rotor 10 will rotate faster. Thus the effective transmission ratio is reduced, and the drive shaft 5 (and its engine) are allowed to continue with little or no reduction in speed,—thereby avoiding any tendency to stall the engine. Sudden decrease of load will be automatically compensated for in a similar (reverse) manner,—thus preventing the engine from racing. In either of these cases (increasing or decreasing load), the change in the rate of revolution of the rotor 10 and the associated parts compensatorily affects the centrifugal force to which the resistance of the fly-wheel 30 is due, since the gyroscopic fly-wheel 30 becomes "stiffer" against lateral deflection with increasing speed, and vice versa.

As shown in Figs. I and II, provision is made for holding fast on the ratio controlling rotor 10, for operation in reverse gear, by means of a friction brake comprising a metal strap 60 with a suitable friction surfacing 61. This strap 60 may be supported by a clip 62 fastened thereto at the top and held in place by the end of a screw 63 extending through the casing 20 and engaging in a hole in the clip. The lower ends of the strap 60 and its facing 61 are bent outward and hooked around take-up member 65 below the rotor 10. As shown in Figs. I and II, these take-up members 65, 65 are actuated by right and left threads on a spindle 66 mounted in the lower portion of the casing 20. By turning the spindle 66 in one direction, the strap brake 60 may be tightened on the rotor 10 to the point of either holding it fast, or reducing its rotation to any degree desired. The spindle 66 carries a pointer 67 that co-operates with a dial 68 mounted on the casing 20 to indicate the degree of tension on the brake.

As shown, the shaft 66 and the take-up 65, 65 are so located relative to the rotor 10 that the ends of the strap 60 extend off tangentially from the surface of the rotor, and are also free to rock on the rounded ends of the take-ups. This arrangement and hinge connection assures substantially uniform friction between the strap facing 61 and the rotor 10 at all points,—without possibility of any crowding of the strap ends against the rotor so as to produce a concentrated local braking action.

When the vehicle is driving "back" through the transmission, as in coasting, the device will transmit reversely, so that the engine can be used as a brake.

Having thus described my invention, I claim:

1. The combination with an epicyclic train having a movable ratio-controlling device, of a gyroscope driven from the source of power of the train and operatively connected to said ratio-controlling device to be deflected relative to its own axis of rotation by the movement of said device, and thus yieldingly opposing the motion of said ratio-controlling device, with means for varying the effective ratio of the connection between said devices.

2. The combination with an epicyclic train having a movable ratio-controlling device, of a gyroscope driven from said ratio-controlling device and operatively connected to said ratio-controlling device to be deflected relative to its own axis of rotation by the movement of said device, and thus yieldingly resisting its motion, with means for varying the effective ratio of the connection between said devices.

3. The combination with an epicyclic transmission gearing having a movable ratio-controlling device, of a gyroscope driven by said device to revolve therewith, with means of connection from the epicyclic gears to said gyroscope for progressively deflecting it as said device revolves, and means for varying the effective ratio of the connection.

4. The combination with an epicyclic transmission gearing and its driving and driven shafts and rotatable ratio-controlling device, of a revolving fly-wheel and a wabble actuator therefor mounted to revolve around one of said shafts, and wabbling connections from the epicyclic gears to said actuator.

5. The combination with an epicyclic transmission gearing and its driving and driven shafts and rotatable ratio-controlling device, of a revolving fly-wheel and a wabble actuator therefor mounted to revolve around one of said shafts, and wabbling connections from the epicyclic gears to said actuator, with a gyratory connector around said shaft for transmitting the motion of said actuators to wabble the fly-wheel, and a universal fulcrum for said connector shiftable along the shaft to vary the action of said actuator on said fly-wheel.

In testimony whereof I have hereunto signed my name at Philadelphia, Pennsylvania, this 17th day of January, 1928.

JOSEPH P. REMINGTON.